(12) United States Patent
Kasprzak et al.

(10) Patent No.: US 8,535,493 B2
(45) Date of Patent: Sep. 17, 2013

(54) "MIAMI MAX HYDRO" THE ULTIMATE HYDROGEN CELL

(75) Inventors: Adam Stefan Kasprzak, Islamorada, FL (US); Rima Kasprzak, Islamorada, FL (US); Shennan Adam Kasprzak, Islamorada, FL (US); Jenneka Sophia Kasprzak, Islamorada, FL (US)

(73) Assignee: Adam Stefan Kaspuzak, Islamovada, FL (US)

( * ) Notice: Subject to any disclaimer, the term of this patent is extended or adjusted under 35 U.S.C. 154(b) by 30 days.

(21) Appl. No.: 13/200,091

(22) Filed: Sep. 19, 2011

(65) Prior Publication Data

US 2012/0292182 A1    Nov. 22, 2012

Related U.S. Application Data

(60) Provisional application No. 61/519,235, filed on May 19, 2011.

(51) Int. Cl.
| C25B 1/00 | (2006.01) |
| C25B 1/02 | (2006.01) |
| C25B 9/00 | (2006.01) |

(52) U.S. Cl.
USPC .......................... 204/242; 204/157.2; 204/194

(58) Field of Classification Search
USPC .......................... 204/275.1, 242, 157.52, 194
See application file for complete search history.

(56) References Cited

U.S. PATENT DOCUMENTS

| 3,972,794 A * | 8/1976 | Lamm ........................... 204/266 |
| 2012/0080311 A1 * | 4/2012 | Stearns ........................ 204/278 |

\* cited by examiner

*Primary Examiner* — Jonathan Johnson
*Assistant Examiner* — Zulmariam Mendez
(74) *Attorney, Agent, or Firm* — Adam S. Kaspuzak; Shennan A. Kaspuzak; Rima Kaspuzak

(57) ABSTRACT

The Miami Max Hydro consists of a cylinder, with an inlet and outlet, contains two disks at one end, one having a positive charge, the other having a negative charge, as dictated by the electrode it is attached to. They do not touch. One is placed over the other and secured to it via a non-conductive material. The inner disk, herein named DISK B, has bored holes, lined with a non-conductive material, to allow passage of the rods that are attached to the outer disk, herein named Disk A, from touching Disk B and short-circuiting the cell. The number of rods of the two disks is adjustable, from two to infinite. Water passes through the cell while a positive and negative charge is applied to each electrode respectively. The electrical current vibrates the rods at a frequency that breaks the hydrogen-oxygen bond. The hydrogen is then harnessed for energy.

1 Claim, 3 Drawing Sheets

DISC "A"

DISC "B"

TOTAL OF 14

1. TOTAL OF 29

"MIAMI MAX HYDRO" THE ULTIMATE HYDROGEN CELL

This application claims the benefit of U.S. Provisional Application No. 61/519,235, filed on May 19, 2011.

SUMMARY OF INVENTION

Process and apparatus for disassociating the hydrogen atoms of a water molecule by electrical force. Particularly, the separation of the hydrogen atom and oxygen atoms from the water molecule by the application of a non-regulated, non-filtered, low power, direct current voltage electrical potential applied to two non-regular oxidizing metal rods having water passing therein between. The direct current voltage may be continuous, but pulsing the non-regulated and non-filtered direct current voltage enhance the sub-atomic action.

The apparatus comprises structural configurations, and there is a disclosed alternative embodiment for segregating the generated hydrogen gas from the oxygen gas.

The water does not have to be pure, and may contain contaminants.

The efficiency of "MIAMI MAX HYDRO" generator relies on the fact of using circular rods instead of plates or tubing introduced in others designs. Low electrical energy and the use of circular rods made Miami Max Hydro generator superior in this industry.

Circular rods versus plates or tubing would require much less energy to produce gas and the air (gas) bubbles are not sticking to the surface area of rods.

Also it's important to notice that tiny vibration of the circular rods caused by electrical input, prevent the gas (air bubble) from sticking to the surface area of the circular rods.

Produced gas, when exposed to the vacuum of the combustion chamber during the stroke, it exponentially expands, and when recompressed during the compression stroke and ignited by the spark plug causes a massive combustion more than enough needed to fully power any combustion intake motor.

Depends on the motor the timing has to be adjusted to find the proper range

INTRODUCTION

The potential availability of hydrogen as a supplement and eventually the complete replacement to the present day available fuels is the key for pollution free averment and clean energy supply. The efficiency of hydrogen as a fuel and its pollution-free qualities qualifies it further and enhances its attractiveness Prior hydrogen generators systems have been successful in splitting the hydrogen atom from the oxygen. The most commonly understood method of separating the hydrogen and oxygen atoms from water is electrolysis. This comprises of placing a direct current voltage in a solution of water and potassium hydroxide. When current flows, and exchange of ions and electrons occurs between the electrodes. Hydrogen atoms collect at the negative electrode (cathode), and oxygen atoms collect at the positive electrode (anode). A separation between the electrodes separates the gases.

Other electrolysis processes have been devised and disclosed; they more sophisticated, more complex, and expensive, resulting in attendant unreliability.

DETAILED DESCRIPTION OF INVENTION AS DEPICTED IN DRAWINGS

Figure 3:
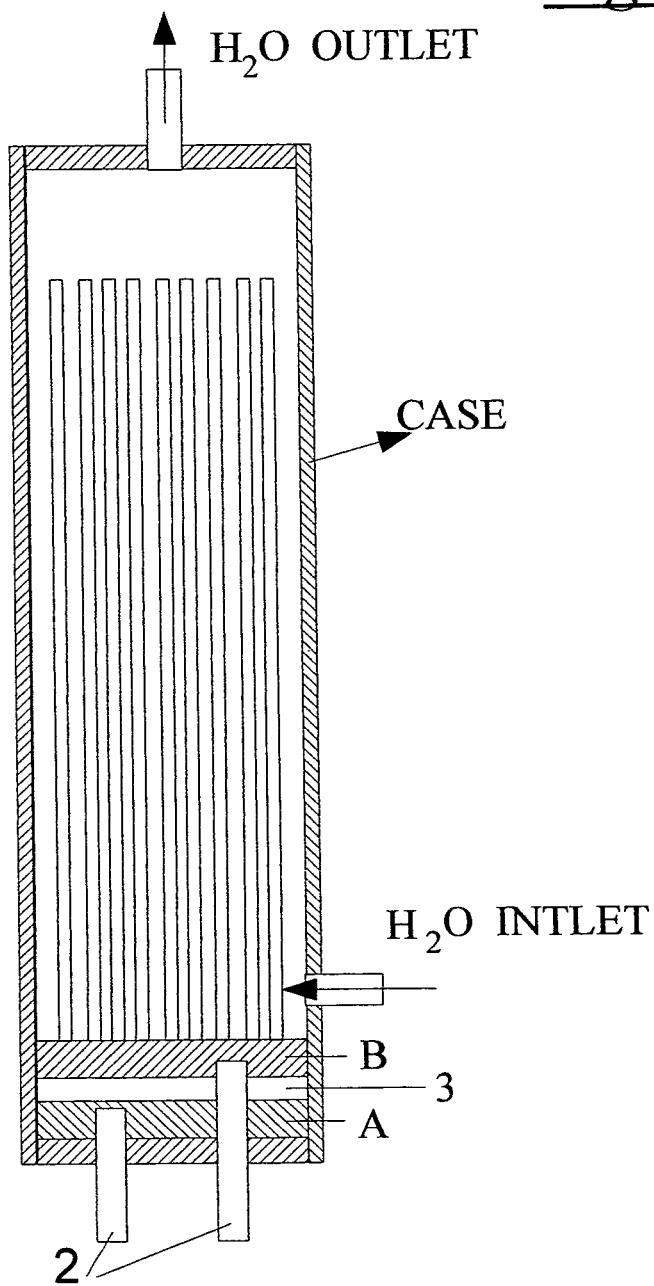
FIG. 3 is an illustration in cross section of the operable constructed preferred embodiment of the present invention.

With particular reference now to FIG. 3 there is illustrated schematically in cross-section the invention in the most simplified embodiment.

A structure represent by FIG. 3 is a complete hydrogen cell/generator. The low voltage, direct current applied to terminals 2 transfers the electrical current to circular rods 1 fastened to disc plates A & B. It does not matter each terminal is positive and each negative. The total number of circular rods in this particular generator/design is (29)—fourteen rods in disc "A" and fifteen rods in a disc "B". The total number of circular rod is not fixed and can vary, depends on the design. Miami Max Hydro individual cells/generators can be group together and electrically connected in serious or parallel.

Figure 1:
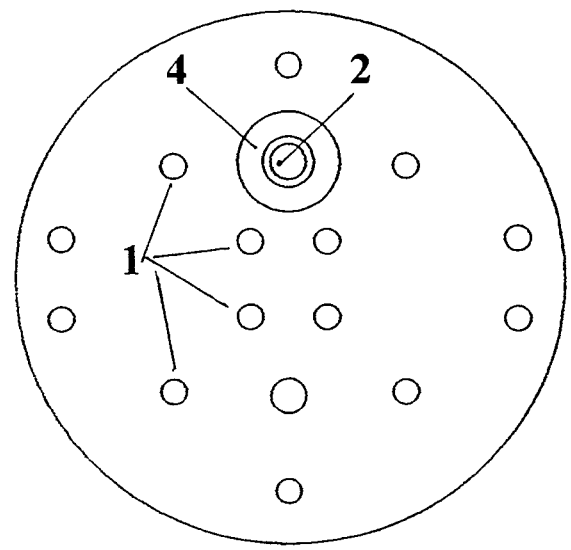
FIGS. 1 & 1a is an illustration of cross section terminal discs A and B. Circular rods arrangement and number of electrodes are optional and can be changed depends on size and design of the generator.
Figure 1A:
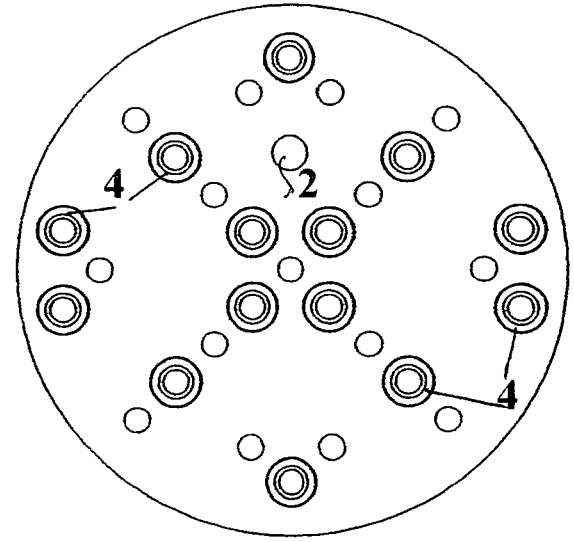
Figure 2:
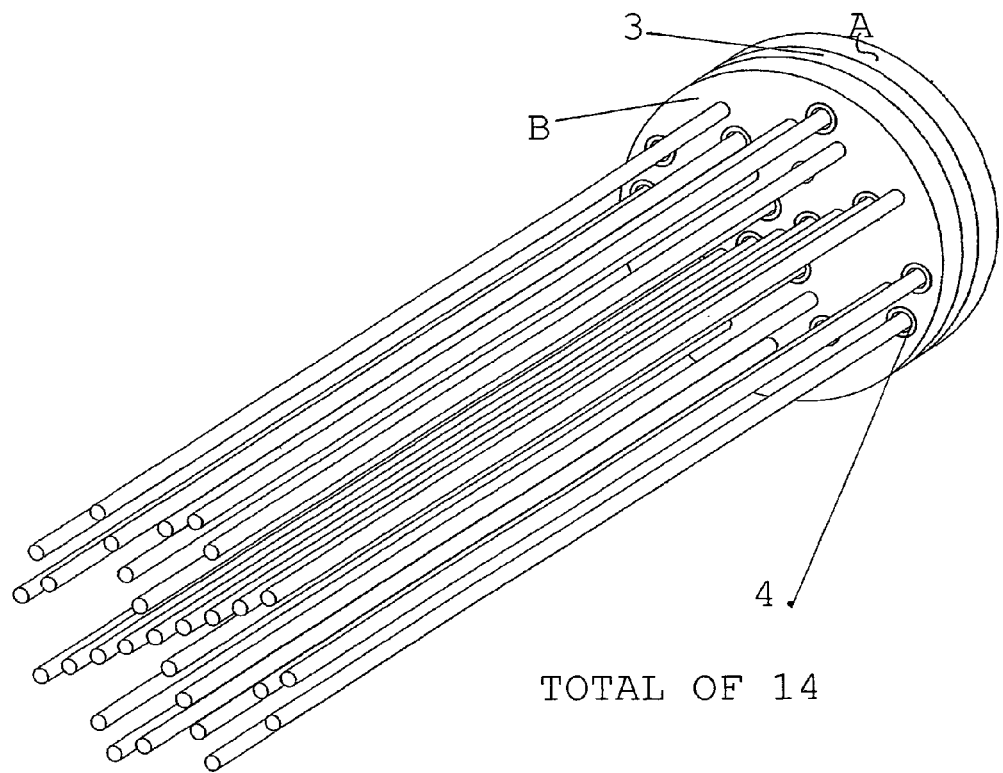
FIG. 2 is an illustration of complete assembly terminal disc A and B

With particular reference in FIG. 2 there is illustrated detail of assembly of terminal discs "A" and "B". During assembly it is absolutely crucial to install isolating sleeves 4 on each of circular rods attached to disc "A". Circular rods 1 are not fixed in the position and can be arranged in any other order, depend on the design. Each individual unit can be sized depends on the design. Terminals 2 are treaded rods necessary to transfer electrical current to the cell/generator. Space 3 between terminal A and B could be filled with any waterproof isolating material available.

The invention claim is:

1. An electrolytic hydrogen generator comprising:
   a. a cylindrical container with a water inlet and a hydrogen outlet;
   b. two disk plates arranged with multiple metallic circular rods, wherein the disk plates are both located at the bottom of the cylindrical container and are separated from each other by an isolating material;
   c. a terminal fastened to each disk plate to transfer an electrical current to the circular rods;
   d. a direct current power source in electrical communication with each terminal; wherein the hydrogen generator, when energized, does not require any type of electromagnetic device to break the water molecule into a gas form;
   e. a generator that works with regular water, requiring no additional chemical additives.

* * * * *

UNITED STATES PATENT AND TRADEMARK OFFICE
CERTIFICATE OF CORRECTION

PATENT NO. : 8,535,493 B2  
APPLICATION NO. : 13/200091  
DATED : September 17, 2013  
INVENTOR(S) : Kasprzak Page 1 of 1

It is certified that error appears in the above-identified patent and that said Letters Patent is hereby corrected as shown below:

Title Page, Item (12) delete "Kasprzak et al." and insert --Kasprzak--.

Title Page, Item (75) Inventors should read

--(75) Inventor: Adam Stefan Kasprzak, Islamorada, FL (US)--.

Signed and Sealed this  
Third Day of May, 2016

Michelle K. Lee  
*Director of the United States Patent and Trademark Office*